(12) United States Patent
Boucher, II

(10) Patent No.: US 9,453,583 B1
(45) Date of Patent: Sep. 27, 2016

(54) VENT FOR TANK

(71) Applicant: Best Fabrications, Inc., Bartow, FL (US)

(72) Inventor: Barry E. Boucher, II, Winter Haven, FL (US)

(73) Assignee: Best Fabrications Inc., Bartow, FL (US)

( * ) Notice: Subject to any disclaimer, the term of this patent is extended or adjusted under 35 U.S.C. 154(b) by 41 days.

(21) Appl. No.: 14/327,475

(22) Filed: Jul. 9, 2014

Related U.S. Application Data

(60) Provisional application No. 61/845,602, filed on Jul. 12, 2013.

(51) Int. Cl.
F16K 24/04 (2006.01)
B60K 15/035 (2006.01)
B60K 15/03 (2006.01)

(52) U.S. Cl.
CPC ......... *F16K 24/04* (2013.01); *B60K 15/03519* (2013.01); *F16K 24/042* (2013.01); *F16K 24/044* (2013.01); *F16K 24/046* (2013.01); *B60K 2015/03289* (2013.01); *B60K 2015/03523* (2013.01); *B60K 2015/03528* (2013.01); *B60K 2015/03542* (2013.01)

(58) Field of Classification Search
CPC .... F16K 24/04; F16K 24/042; F16K 24/044; F16K 24/046; B60K 15/03; B60K 15/035; B60K 15/0354; B60K 15/03519; B60K 2015/03523; B60K 2015/03542; B60K 2015/03289; B60K 2015/03528; B60K 2015/03554; B63B 25/08; B63B 25/082
USPC ............................. 137/202, 43; 123/518, 519
See application file for complete search history.

(56) References Cited

U.S. PATENT DOCUMENTS

| 3,786,829 | A | * | 1/1974 | Nardo | F16K 24/046 137/202 |
| 3,857,350 | A | | 12/1974 | Rohan | |
| 4,457,443 | A | * | 7/1984 | Casimir | B60K 15/03504 220/500 |
| 4,630,749 | A | | 12/1986 | Armstrong et al. | |
| 4,854,469 | A | | 8/1989 | Hargest | |
| 5,035,729 | A | | 7/1991 | Hodgkins | |
| 5,327,946 | A | | 7/1994 | Perkins | |
| 5,386,843 | A | | 2/1995 | Church | |
| 5,469,800 | A | | 11/1995 | Brotz | |
| 5,529,086 | A | * | 6/1996 | Kasugai | B60K 15/03519 137/202 |
| 6,152,196 | A | | 11/2000 | Kehoe | |
| 6,719,000 | B1 | | 4/2004 | Forsythe et al. | |

(Continued)

*Primary Examiner* — William McCalister
*Assistant Examiner* — Ian Paquette
(74) *Attorney, Agent, or Firm* — Frijouf, Rust & Pyle P.A.

(57) ABSTRACT

An improved vent for a fuel tank is disclosed for a fuel tank having a tank top wall defining an access aperture. The improved vent comprises a canister defining an internal volume having an open top secured to an interior surface of the tank top wall adjacent to the access aperture defined in the tank top wall. A vent aperture is defined in a sidewall of the canister with a proximal end of a vent pipe secured to the vent aperture. A hanger interposed between the interior surface of the tank top wall and the vent pipe for spacing the distal end of the vent pipe from the interior surface of the tank top wall to enable fuel entering the distal end of the vent pipe to close the float valve. The improved vent permits the canister to be located at a first preferred location for servicing of the float valve while permitting the distal end of the vent pipe to be located at a second preferred location for enabling venting upon the tilting of the fuel tank.

13 Claims, 4 Drawing Sheets

(56) References Cited

U.S. PATENT DOCUMENTS

| | | | |
|---|---|---|---|
| 6,866,056 B1 | 3/2005 | Scott | |
| 7,080,657 B1 | 7/2006 | Scott | |
| 7,225,826 B2 | 6/2007 | Riviezzo | |
| 7,380,542 B1 | 6/2008 | Herrington | |
| 7,422,027 B2 | 9/2008 | Riviezzo | |
| 2003/0127134 A1* | 7/2003 | Mills | B60K 15/03519 137/202 |
| 2003/0205272 A1* | 11/2003 | Benjey | B60K 15/03504 137/202 |
| 2004/0256006 A1* | 12/2004 | Aschoff | B60K 15/035 137/202 |
| 2006/0042690 A1* | 3/2006 | Aoki | B60K 15/03519 137/202 |
| 2006/0283501 A1* | 12/2006 | Devall | B60K 15/03504 137/43 |
| 2010/0065137 A1 | 3/2010 | Armellino | |
| 2011/0308662 A1 | 12/2011 | Brown et al. | |
| 2012/0186453 A1 | 7/2012 | Gordon | |
| 2013/0008899 A1* | 1/2013 | Hisadomi | B60K 15/03 220/86.2 |
| 2013/0255797 A1* | 10/2013 | Coulon | B60K 15/03519 137/386 |

\* cited by examiner

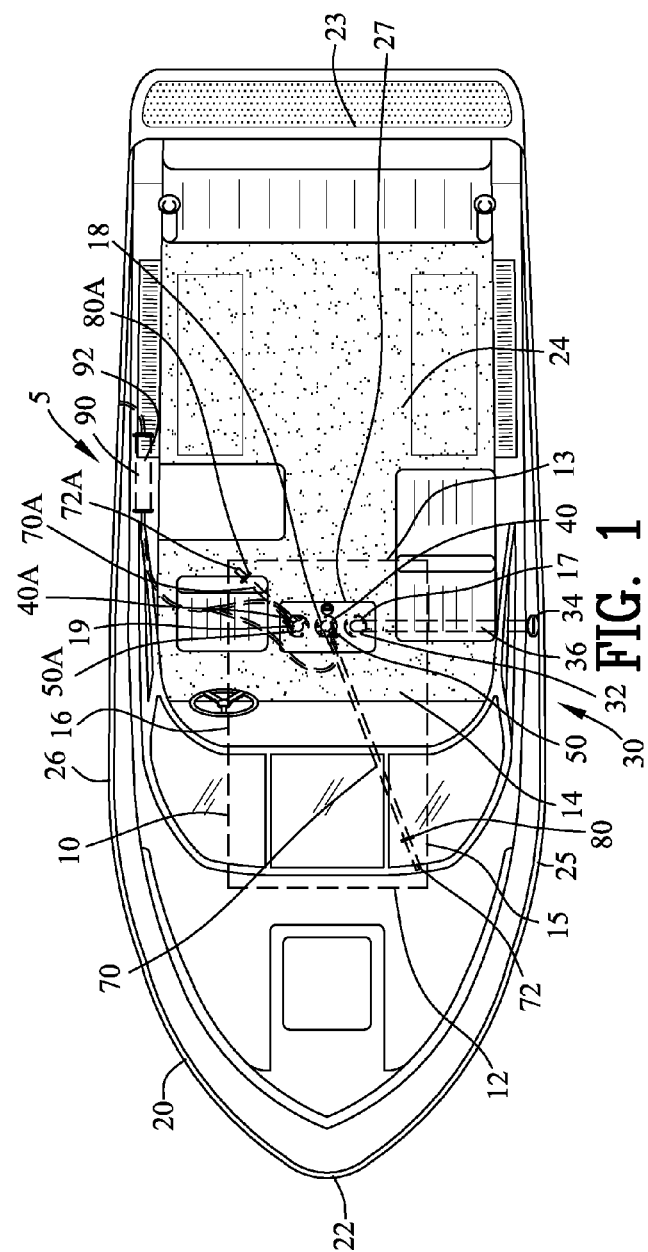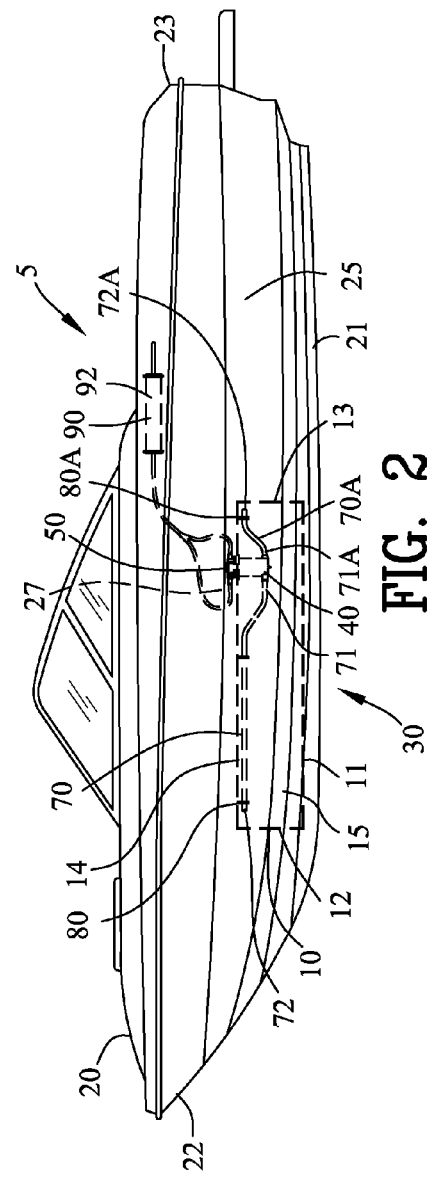

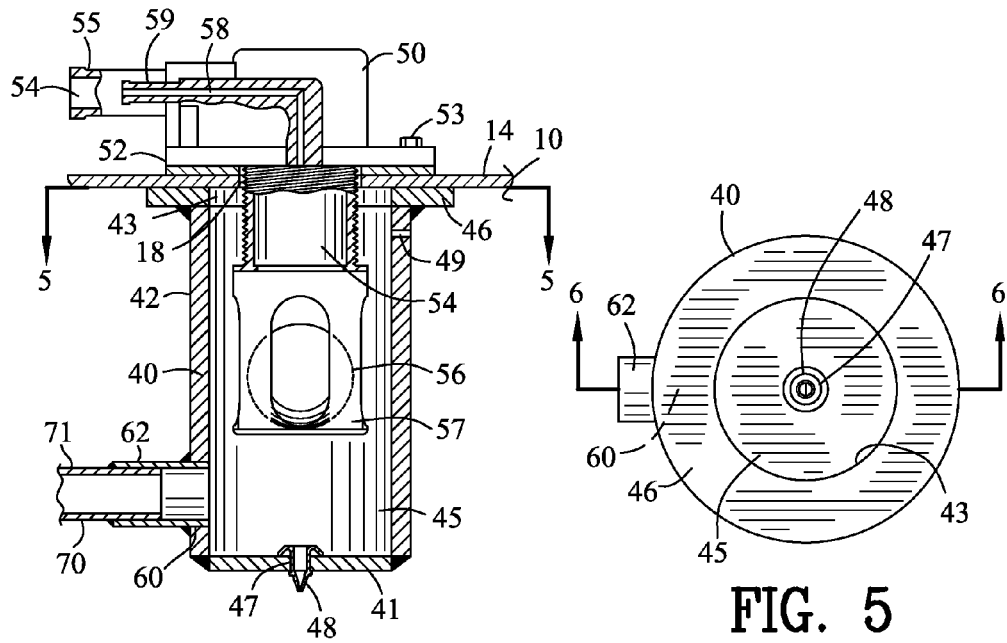
FIG. 3
FIG. 5
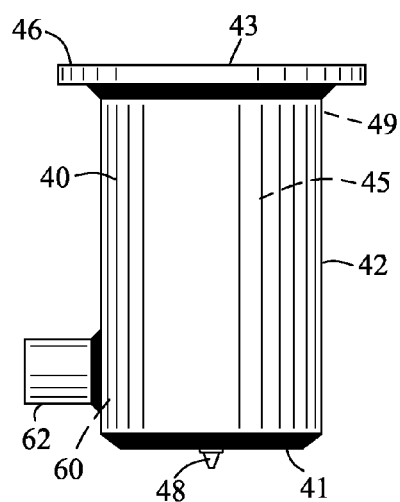
FIG. 4
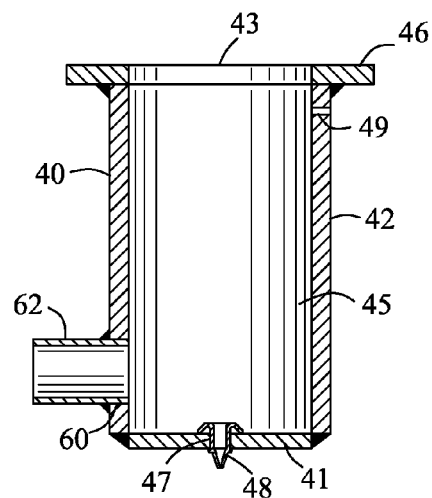
FIG. 6

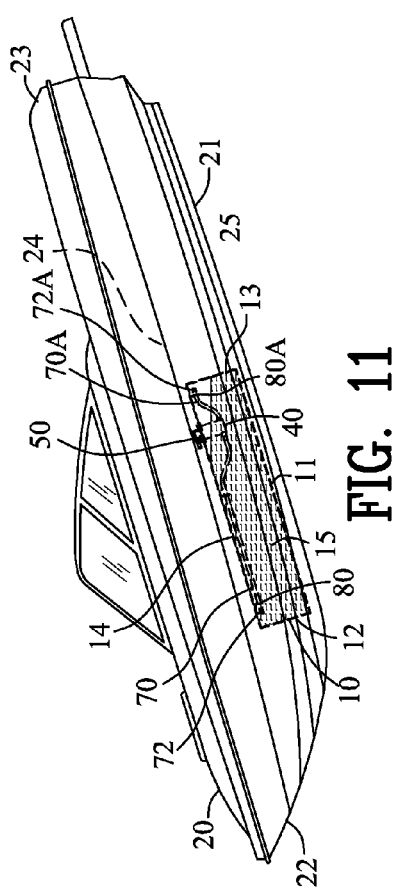
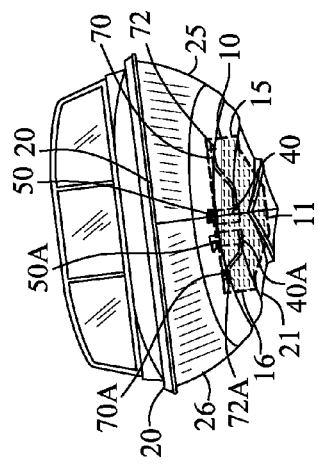
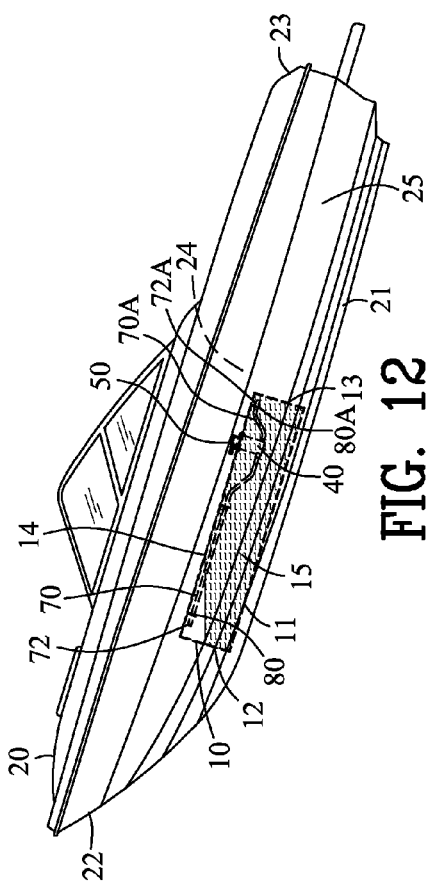

VENT FOR TANK

CROSS-REFERENCE TO RELATED APPLICATIONS

This application claims benefit of U.S. Patent Provisional application No. 61/845,602 filed Jul. 12, 2013. All subject matter set forth in provisional application No. 61/845,602 filed Jul. 12, 2013 is hereby incorporated by reference into the present application as if fully set forth herein.

BACKGROUND OF THE INVENTION

1. Field of the Invention

This invention relates to tanks and more particularly to the venting of tanks subject to titling or listing such as marine fuel tanks.

2. Description of the Related Art

Since gasoline vapors present substantial safety hazards in marine vessel applications, gasoline fuel tank venting has long been known as a significant issue and has been addressed by many in the prior art. In addition to being a fire and explosion safety hazard, fuel vapor has also become an environmental issue.

The Environmental Protection Agency (EPA) has promulgated several regulations intended to reduce environmental pollution cause by gasoline vapors. These regulations have affected the methods and requirements in the production, storage, transportation and dispensing of gasoline.

These regulations have been extended to apply to marine engines. EPA regulation 40 CFR Chapter 1045 relates to the Control Of Emissions From Spark Ignition Propulsion Marine Engines and Vessels. EPA regulation 40 CFR Chapter 1060 relates to the Control Of Evaporative Emissions From New and In-Use Non-road and Stationary Equipment. These regulations established limits for the evaporative and diurnal (daily) emissions from marine gasoline fuel tanks. The EPA deferred the establishment of some of the testing requirements to the boating industry standards organization, The American Boat and Yacht Council (ABYC). The ABYC subsequently issued standard H-24 Gasoline Fuel Systems.

Applying the requirements of ABYC H-24 (tilt testing for ullage/air space) can result in fuel capacity losses up to or possibly exceeding 30% for some vessels. These extreme capacity losses are especially true if the vent fittings are located near the center of the fuel tank. Prior art solutions to this problem generally were addressed by several approaches.

To solve this problem of loss of fuel capacity, additional ullage vent valves or grade vent valves (at times two extra valves per tank) were placed at optimal vent locations on the fuel tank. However, U.S. Coast Guard regulations in 33 CFR 183.554 requires each fuel system fitting, joint and connection to located to be reached for inspection, removal, or maintenance without removal of permanent boat structure. Accordingly, multiple access plates had to be located at multiple locations to permit access to each of the ullage vent valves or grade vent valves. The multiple access plates results in unattractive decks, increased tooling costs and greater chance of leakage due to multiple fittings.

There have been several in the prior art who have attempted to solve these problems with varying degrees of success. None, however completely satisfies the requirements for a complete solution to the aforestated problem, wherein the ullage volume can be minimized while complying with the evaporative and diurnal regulations. The following U.S. Patents are attempts of the prior art to solve this problem.

U.S. Pat. No. 3,857,350 to Rohan discloses a fuel vent sump tank to prevent overboard spillage of fuel on marine craft comprising a sump tank connected to the fuel tank vent line, the vent line having a fuel flow alarm which informs an operator that fuel is being received into the vent line, the excess fuel being collected in the overboard vent sump tank. The collected fuel in the sump tank may be returned to the fuel tank. This system prevents accidental spillage or dumping of fuel overboard during the filling of the fuel tank or tanks.

U.S. Pat. No. 4,630,749 to Armstrong, et al. discloses a fuel fill tube for a vehicle fuel tank having a canister vapor vent, a shut-off valve and an overfill protection valve. The overfill valve prevents liquid from communicating with the carbon canister during overfill and communicates the liquid to the atmospheric open end of the fill tube.

U.S. Pat. No. 4,854,469 to Hargest discloses a pollution control device for marine fuel tanks including a conduit attachable to a fuel tank vent defined in the hull of a boat. The conduit is connected through an opening in a housing to an inlet tube which extends inside the housing. The floor of the housing slopes toward the inlet tube which has defined therein a liquid fuel outlet opening. A separation baffle extends from the top of the housing down toward the floor and away from the fuel outlet opening. On the side of the separation baffle opposite the side on which the inlet tube is disposed, a vapor opening is defined through the top wall of the housing. A flow turning baffle is disposed on the same side of the separation baffle as the vapor opening. A transparent section forms a portion of the housing sides and top that permits visual observation of the inlet tube, which extends into the housing to a height at a level higher than the level at which the free end of the separation baffle terminates. The flow turning baffle requires fuel to make a number of 180.degree turns before being able to exit through the vapor opening.

U.S. Pat. No. 5,035,729 to Hodgkins discloses a fuel tank venting system for a boat including a fuel tank the interior of which is open to a filler tube and a vent line. A liquid separation and recovery device is connected to the vent line and an outlet line which is open to atmosphere. Vapor delivered to the device through the vent line enters an inlet and passes through an opening. The vapor then passes through a screen, around a sphere that is buoyant in the liquid fuel, and escapes from the device through an outlet. When liquid fuel enters the device, the sphere rises blocking flow to the outlet. The trapped liquid passes through an opening into a cavity. The liquid entering the cavity displaces a spring loaded piston. When liquid is no longer being delivered to the cavity, the piston pushes the liquid back out the inlet and down the vent line to the fuel tank. In excess pressure situations, when liquid is being delivered to the device, a movable member is displaced upward opening a flow path to the outlet of the device through a second chamber. Once the over-pressure condition has subsided, the movable member returns to its original condition to prevent the passage of liquid through the device.

U.S. Pat. No. 5,327,946 to Perkins discloses a liquid fuel tank filling and venting device including a hollow body member containing a chamber, an inlet opening for supplying fuel downwardly into the chamber, a fuel outlet opening for supplying fuel from the chamber, and a vent opening connected with the chamber, each of the fuel outlet and vent outlets being independently connected with the fuel tank, whereby overflow fuel is returned to the chamber via the vent outlet. A fuel cap is provided for closing the inlet opening, the fuel cap containing a vent passageway including both a back-flame arresting screen and a fuel surge protector, so that the tank is normally vented to atmosphere when the fuel cap is in the closed position, but the venting passageway automatically closed upon the occurrence of a fuel surge, thereby avoiding undesirable fuel leakage.

U.S. Pat. No. 5,386,843 to Church discloses an apparatus for enabling the discharge of air and vapor from the head space of a fuel tank while preventing the discharge of liquid therethrough, having an inlet in communication with the head space and an outlet in connection with atmosphere. The apparatus has an internal chamber. A body is positioned above an orifice in a retainer inside the chamber. A relief element with an opening therethrough is positioned between the body and the outlet. When air and vapor flow through the device, Bernoulli's Principle causes the body to be suspended between the orifice and the opening in the relief element. When liquid enters the chamber, the body floats upward in the liquid and if the chamber fills with liquid, blocks the opening to prevent the discharge of liquid from the device. Liquid prevented from flowing out of chamber, flows back into the fuel tank when fluid is no longer being delivered into the device.

U.S. Pat. No. 5,469,800 to Brotz discloses a device and method for use when filling the internal fuel tank of a boat having an air outlet vent in fluid communication with the fuel tank with the air outlet vent exiting from a side of the boat's hull. The structure of the device is disposed in proximity to the air outlet vent for the collection and proper disposal of any overflow fuel exiting the air outlet vent to prevent its discharge into the water surrounding the boat.

U.S. Pat. No. 6,152,196 to Kehoe discloses a filling and venting system for a fuel tank which includes a canister having a fill section and a vent section defined therein. The fill section including a fuel inlet portion for the introduction of fuel thereinto and a fuel outlet portion configured to be attached to a fuel tank for directing fuel thereinto. The vent section includes a vapor outlet port configured to be attached to a vent and a vapor inlet port configured to be attached to the fuel tank to permit vapor to pass from the fuel tank, through the canister and to the vent. The vapor inlet port is configured to project into the fuel tank to a level below a level at which the fuel outlet port enters the fuel tank. A partition assembly includes a wall separating the fill section and the vent section. The wall includes an opening defined therein which permits fluid to flow therethrough. The partition assembly further includes a floatable sealing member which is disposed so as to cover the opening in the wall to prevent fluid flow therethrough when a level of liquid in the canister is below a predetermined value and to uncover the opening when the level of liquid is above the predetermined value.

U.S. Pat. No. 6,719,000 to Forsythe, et al. discloses a two-stage vent valve incorporated into a vehicle fuel distribution system. The vent valve is mounted to the top of a fuel tank of a motor vehicle in a vertically orientated position, so that a fluid inlet is in communication with the interior open air volume of the fuel tank, and an outlet is in communication with the exterior of the tank. The vent valve utilizes a two-stage valve mechanism to allow vapor to escape from the fuel tank, while preventing the leakage of liquid fuel during such operating conditions where the vehicle has tilted due to a small downgrade, sloshing of fuel in a full or near-full tank, or the event of a roll-over.

U.S. Pat. No. 6,866,056 to Scott discloses a fuel tank venting system including a fuel cap, a vent diaphragm and a vent disc. A valve cavity with a substantially concave bottom is formed in a bottom of the fuel cap. The vent disc preferably includes a disc flange and a diaphragm projection. At least one air passage is formed through the vent disc. A substantially convex surface is formed on a top of the diaphragm projection. The vent diaphragm is retained between the substantially concave bottom and the substantially convex surface. When air is needed for fuel flow, a vacuum within the fuel tank pulls the perimeter of the vent diaphragm downward, which breaks a seal with the substantially concave bottom. Air flows around the unsealed perimeter of the vent diaphragm through the at least one air passage. In a second embodiment, the fuel tank venting system is contained in a wall of the fuel tank.

U.S. Pat. No. 7,225,826 to Riviezzo discloses a simple fuel vent assembly for use in inboard and outboard fuel tanks for marine vessels. The vent assembly includes upper and lower portions defining an L shaped interior passageway. The lower portion includes upper and lower valve seats positioned within this passageway. Spaced vent openings extend through the lower portion above and below the valve seat. A spherical float is positioned within the passageway between the upper and lower valve seats. As fuel is added to the tank, pressure can escape through the fuel vent. The flow valve is within the passageway as the level of liquid fuel in the tank rises during the fuel refilling process. When the tank is at its desired fill level the float engages the upper valve seat and forms a seal preventing liquid fuel from traveling past the upper seat and through the passageway into the atmosphere outside the tank. The second vent opening remained open to vent pressure from the space between the top of the tank and the fuel level.

U.S. Pat. No. 7,380,542 to Herrington discloses an apparatus for preventing discharge of fuel from vent line when fueling a boat or other marine craft. A collection tank is mounted in the vent line from the main fuel tank, upstream of the overboard vent of the vessel. The collection tank includes a small, secondary reservoir within the main volume of the tank. Fuel escaping the main tank through the vent line enters the collection tank through two fitting, one being located in the bottom of the collection tank within the secondary reservoir and the other being located outside the reservoir; air displaced from the tank escapes to the overboard vent through an outlet fitting in the top of the collection tank. A float switch or other liquid level sensor is located within the secondary reservoir and is operatively connected to a warning light or other alarm device. Because the secondary reservoir is smaller than the main volume of the collection tank the fuel fills the reservoir first, and thus actuates the warning device well in advance of the main volume of the collection tank filling up with fuel that might escape through the overboard vent.

U.S. Pat. No. 7,422,027 to Riviezzo discloses a simple fuel vent assembly for use in inboard and outboard fuel tanks for marine vessels. The vent assembly includes upper and lower portions defining an L shaped interior passageway. The lower portion includes upper and lower valve seats positioned within this passageway. Spaced vent openings extend through the lower portion above and below the valve seat. A spherical float is positioned within the passageway between the upper and lower valve seats. As fuel is added to the tank, pressure can escape through the fuel vent. The flow valve is within the passageway as the level of liquid fuel in the tank rises during the fuel refilling process. When the tank is at its desired fill level the float engages the upper valve seat and forms a seal preventing liquid fuel from traveling past the upper seat and through the passageway into the atmosphere outside the tank. The second vent opening remained open to vent pressure from the space between the top of the tank and the fuel level.

U.S. Pat. No. 7,080,657 to Scott discloses a fuel tank venting system including a fuel cap, a vent diaphragm and a vent disc. A valve cavity with a substantially concave bottom is formed in a bottom of the fuel cap. At least one air passage is formed through the vent disc. A substantially convex surface is formed on a top of the diaphragm projection. The vent diaphragm is retained between the substantially concave bottom and the substantially convex surface. When air is needed for fuel flow, a vacuum within the fuel tank pulls the perimeter of the vent diaphragm downward, which breaks a seal with the substantially concave bottom to allow air flow. In a second embodiment, the fuel tank venting system is contained in a wall of the fuel tank. In a third embodiment, the fuel tank vent.

United States Patent Application 20100065137 to Armellino discloses a spill preventing system for vented marine fuel tanks incorporating a capture reservoir at the discharge end of the vent conduit extending from the tank. Any fuel forced into the vent conduit during the filling operation is temporarily retained within the capture reservoir and returned to the tank and is not ejected through the vent port into the environment.

United States Patent Application 20110308662 to Christopher, et al. discloses a ullage system for a marine fuel tank that maintains an exact ullage space in all marine refueling situations including refueling in moving or pitching and rolling situations. The invention includes two ball valve assemblies that are inserted into a fuel tank at approximately the same level. The two assemblies typically are at opposite ends of the tank. One of the ball valves is smaller than the other in diameter. The smaller valve is coupled to an air vent; the larger valve is coupled to the filler tube. An important feature of the present invention is that it can typically be made to fit any marine fuel tank simply by changing the length of a vent tube to reach the correct ullage level for the tank at hand. The components of the present invention can be made from standard fuel valve materials.

United States Patent Application 20120186453 to Gordon discloses a gas, diesel or other similar liquid fume or vapor filter apparatus specifically designed to be utilized in the marine environment e.g. motorized boats. The fume or vapor filter apparatus includes a housing with an input and output coupling mechanism designed to engage the input and output vent line.

Although the aforementioned prior art have contributed to the development of the marine art, none of these prior art patents have solved the above requirements imposed by new regulations.

Therefore, it is an object of the present invention to provide an improved tank vent for limiting the evaporative and diurnal emissions from marine gasoline fuel tanks.

Another object of this invention is to provide an improved tank vent for limiting the emissions from marine gasoline fuel tanks wherein fittings must are removable for maintenance and replacement without removal of permanent boat structure.

Another object of this invention is to provide an improved tank vent for enabling venting of the gasoline fuel tanks under various tilt requirements imposed for marine fuel tanks.

Another object of this invention is to provide an improved tank vent that is a cost effectively solution.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved vent for a fuel tank having a tank top wall defining an access aperture for accommodating a float valve. The improved vent comprises a canister having a bottom wall and a side wall extending from the bottom wall to define an open top. The canister defines an internal volume for receiving the float valve. A mounting flange is secured to the open top of the canister with a weld securing the mounting flange to an interior surface of the tank top wall adjacent to the access aperture defined in the tank top wall. A vent aperture is defined in the sidewall of the canister. A vent pipe extending between a proximal end and a distal end with a weld securing the proximal end of the vent pipe connected to the vent aperture defined in the sidewall of the canister. A hanger is interposed between the interior surface of the tank top wall and the vent pipe for spacing the distal end of the vent pipe from the interior surface of the tank top wall to enable fuel entering the distal end of the vent pipe to close the float valve. Preferably, the canister is located in a first preferred location for servicing of the float valve and the distal end of the vent pipe is located a second preferred location for enabling venting upon the tilting of the fuel tank. A one-way valve is located in the bottom wall of the canister for draining fuel from the canister into the fuel tank.

In a more specific embodiment, the invention is incorporated into an improved vent for a fuel tank having a tank top wall having an access aperture. The improved vent comprises a canister having a bottom wall and a side wall extending from the bottom wall to define an open top. The side wall is secured to an interior surface of the tank top wall adjacent to the access aperture defined in the tank top wall. A vent aperture is defined in the sidewall of the canister. A float valve has a closure flange removably secured to an exterior surface of the tank top wall for sealing the open top of the canister with the float valve located within the canister for limiting the amount of fuel entering into the fuel tank. A vent pipe extends between a proximal end and a distal end. The proximal end of the vent pipe is connected to the vent aperture defined in the sidewall of the canister. The distal end of the vent pipe extends to a preferred region of the fuel tank to be vented upon the tilting of the fuel tank.

Preferably, the canister is located at a first preferred location for servicing of the float valve and the distal end of the vent pipe is located at a second preferred location for enabling venting upon the tilting of the fuel tank. The float valve is removably secured to an exterior surface of the tank top wall for inspection and servicing of the float valve. In one specific embodiment, a major vent output pipe extends external the fuel tank from the float valve for venting the fuel tank for connection to an external vapor containment system such as a passive purge system or a sealed system.

In another embodiment, the invention is incorporated into an improved marine fuel system comprising a fuel tank having a tank bottom wall supporting a port sidewall, a starboard sidewall, a bow sidewall, stern sidewall and a tank top wall. A first and a second access aperture are defined in the tank top wall. A first and a second canister are secured to an interior surface of the tank top wall adjacent to the first and second access apertures, respectively. A first and a second vent aperture are defined in the first and second canisters. A first and a second float valve have a first and second closure for removably securing the first and second float valves to an exterior surface of the tank top wall for sealing the open top of the first and second canisters. A first and second vent pipe each extends from a proximal end to a distal end. The first and second proximal ends of the first and second vent pipes are connected to the first and second vent apertures defined in the first and second canisters. A first and a second hanger are interposed between the interior surface of the tank top wall and the first and second vent pipes for spacing the first and second distal ends of the vent pipes from the interior surface of the tank top wall. The first and second hangers locate the first and second distal ends of the vent pipes in proximity to opposed diagonal corners of the fuel tank to enable fuel entering the distal ends of the first and second vent pipes to close the first and second float valves, respectively, for limiting the amount of fuel entering into the fuel tank.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 1 is a top view of a marine vessel incorporating a vent for fuel tank incorporating the present invention;

FIG. 2 is a side view of the marine vessel of FIG. 1.

FIG. 3 is an enlarged side sectional view of a vent canister and a float valve shown in FIGS. 1 and 2;

FIG. 4 is a side view of the vent canister shown in FIG. 3;

FIG. 5 is a view along line 5-5 of the vent canister shown in FIG. 4;

FIG. 6 is a sectional view along line 6-6 of the vent canister shown in FIG. 5;

FIG. 11 is a side view of the marine vessel of FIG. 1 with the stern pitched upward seventeen (17°) degrees;

FIG. 12 is a side view of the marine vessel of FIG. 1 with the bow pitched upward seventeen (17°) degrees;

FIG. 13 is a front view of the marine vessel of FIG. 1 with the hull rolled seven (7°) degrees to starboard; and FIG. 14 is a front view of the marine vessel of FIG. 1 with the hull rolled seven (7°) degrees to port.

Similar reference characters refer to similar parts throughout the several Figures of the drawings.

DETAILED DISCUSSION

Figure 7:
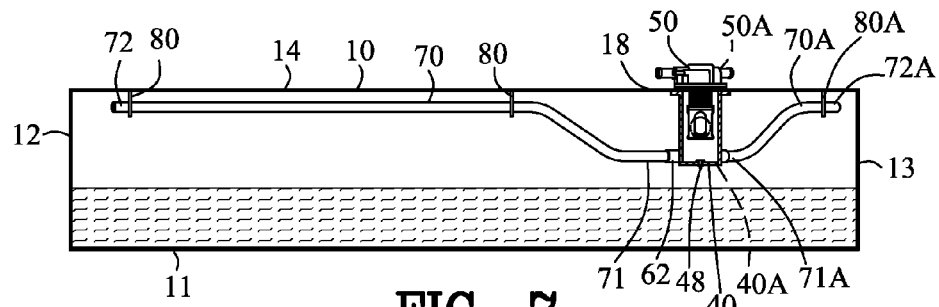
FIG. 7 is a side view of the fuel tank of FIGS. 1-2 partially filled with fuel.

FIGS. 1 and 2 are top and side views of a vent 5 of the present invention for fuel tank 10 incorporated into a marine vessel 20. The fuel tank 10 comprises a tank bottom wall 11, a tank bow sidewall 12, a tank stern wall 13, tank top wall 14, tank port sidewall 15 and a tank starboard sidewall 16. An access aperture 17 is defined in the tank top wall 14. In this example, a second and a third access aperture 18 and 19 are defined in the tank top wall 14 adjacent to the access aperture 17.

The marine vessel 20 defines a bottom 21, a bow 22, a stern 23, a floorboard 24. a port side 25 and a starboard side 26. The fuel tank 10 is mounted permanently between the bottom 21 and the floorboard 24. Many parts of the fuel tank 10 are not accessible due to the permanent mounting of the fuel tank 10 between the bottom 21 and the floorboard 24.

An inspection panel 27 is located in the floorboard 24 adjacent to the access apertures 17-19. The inspection panel 27 permits access to the region in proximity to the access apertures 17-19. The inspection panel 27 satisfies U.S. Coast Guard regulations in 33 CFR 183.554 requiring each fuel system fitting, joint and connection to be located for easy inspection, removal, or maintenance without removal of permanent boat structure.

A conventional fuel fill system 30 is connected to the fuel tank 10 for filling the fuel tank 10 with fuel. The conventional fuel fill system 30 comprises a fuel fill valve 32 located in access aperture 17. The fuel fill valve 32 is connected to a deck fitting 34 by a fill pipe 36. Access to the fuel fill valve 32 is gained through the inspection panel 27 in compliance with U.S. Coast Guard regulations in 33 CFR 183.554.

A canister 40 is secured to an interior surface of the tank top wall 14 adjacent to the access aperture 18. In this example, a second canister 40A is secured to the interior surface of the tank top wall 14 adjacent to the second access aperture 19. The second canister 40A is identical to the canister 40.

A float valve 50 is secured to an exterior surface of the tank top wall 14 for sealing the open top of the canister 40. In this example, a second float valve 50A is secured to the exterior surface of the tank top wall 14 for sealing the open top of the canister 40A. The second float valve 50A is identical to the float valve 50.

FIGS. 3-6 are enlarged views of the vent canister 40 and the float valve 50 shown in FIGS. 1 and 2. The canister 40 has a bottom wall 41 and a side wall 42 extending from the bottom wall 41 to define an open top 43. The canister 40 defines an internal volume 45 for receiving the float valve 50. A mounting flange 46 is secured to the side wall 42 in proximity to the open top 43. Preferably, the bottom wall 41 and the mounting flange 46 are welded to the side wall 42 of the canister 40. In the alternative, the canister 40 including the mounting flange 46 may be cast as a single unit as should be well known to those skilled in the art.

A drain hole 47 is defined in the bottom wall 41 of the canister 40. The drain hole 47 is configured to receive a one-way valve 48 for enabling fuel to drain from the internal volume 45 of the canister into the fuel tank 10. A relief vent orifice 49 extends through the side wall 42 of the canister 40 in proximity to the mounting flange 46 for use as a secondary venting orifice.

A vent aperture 60 is defined in the sidewall 42 of the canister 40. Preferably, the vent aperture 60 comprises a sleeve 62 secured to the side wall 42 of the canister 40 by a weld. The sleeve 62 is configured to receive a vent pipe 70 as best shown in FIG. 3 the purpose and operation of which will be explained in greater detain hereinafter.

A weld secures the mounting flange 46 of the canister 40 to an interior surface of the tank top wall 14 adjacent to the access aperture 18 in the tank top wall 14. In a similar manner, a weld secures the second canister 40A to an interior surface of the tank top wall 14 adjacent to the second access aperture 19 in the tank top wall 14.

The float valve 50 has a closure 52 for removably securing the float valve 50 to an exterior surface of the tank top wall 14. Preferably, the closure 52 of the float valve 50 is secured to the tank top wall 14 by threaded fasteners 53. The threaded fasteners 53 permit the removal of the float valve 50 for inspection and servicing of the float valve 50 and associated fittings. Access to the float valve 50 is gained through the inspection panel 27 in compliance with U.S. Coast Guard regulations in 33 CFR 183.554.

The float valve 50 includes a major channel 54 extending from the float valve 50 and terminating in a major vent output pipe 55 extending external to the fuel tank 10. A ball valve 56 is retained in a cage 57 for opening and closing the major channel 54 in accordance with the level of the fuel in the fuel tank 10.

The float valve 50 includes a minor channel 58 independent from the major channel 54. The minor channel 58 has a smaller aperture relative to the major channel 54. The minor channel 58 extends from internal volume 45 of the canister 40 and terminates in a minor vent output pipe 59 extending external to the fuel tank 10. The relief vent orifice 49 in the side wall 42 of the canister 40 is located above the level of the ball valve 56. The relief vent orifice 49 communicated with the minor channel 58 to function as pressure relief vent when the fuel tank 10 is completely filled with fuel. In this example, the float valve 50 is shown as a BK441 XXXX manufactured by Blu Skies LLC. Although a specific float valve 50 has been shown as an example in the present specification, it should be understood that various types of valves may be used in association with the present invention. In this example, the float valve 50A is identical to the float valve 50 shown in FIGS. 3-6.

FIG. 7 is a side view of the fuel tank 10 of FIGS. 1-2 partially filled with fuel. The vent pipe 70 extends from a proximal end 71 to a distal end 72. The proximal end 71 of the vent pipe 70 is connected to the sleeve 62 of the vent aperture 60 defined in the canister 40. Preferably, the proximal end 71 of the vent pipe 70 is welded to the sleeve 62. A hanger 80 is interposed between the interior surface of the tank top wall 14 and the vent pipe 70 for spacing the distal end 72 of the vent pipe 70 from the interior surface of the tank top wall 14.

The float valve 50A is connected to the vent pipe 70A in a similar manner. The vent pipe 70A extends from a proximal end 71A to a distal end 72A. The proximal end 71A of the vent pipe 70A is connected to the canister 40A in a manner similar to the canister 40. A hanger 80A is interposed between the interior surface of the tank top wall 14 and the vent pipe 70A for spacing the distal end 72A of the vent pipe 70A from the interior surface of the tank top wall 14.

Figure 8:
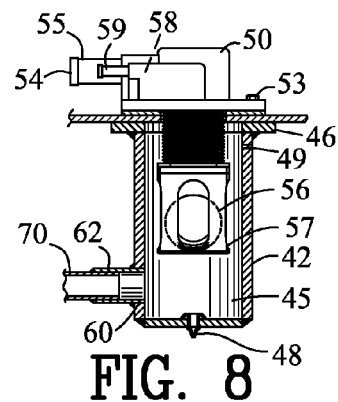
FIG. 8 is an enlarged view of the float valve shown in FIG. 7.

FIG. 8 is an enlarged view of the float valve 50 shown in FIG. 7. The fuel level in the fuel tank 10 is below the level of the distal ends 72 and 72A of the vent pipes 70 and 70A. Accordingly, the ball valve 56 located at the lowest position within the cage 57 by action of gravity for maintaining the float valve 50 in an open position. The float valve 50 enables venting of the fuel tank 10 to the exterior of the fuel tank 10 through the major channel 54 and terminating in a major vent output pipe 55

Figure 9:
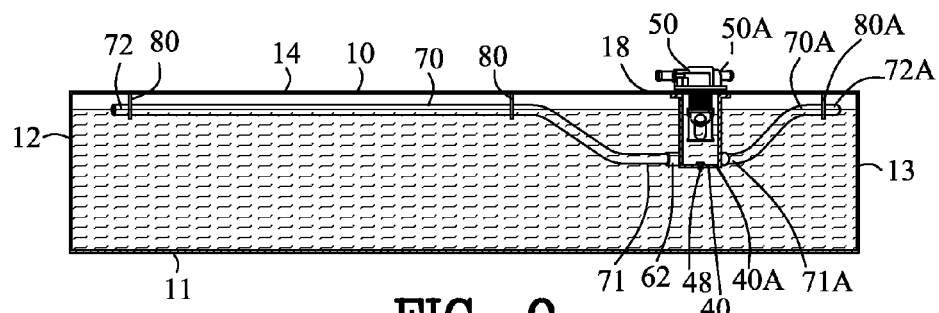
FIG. 9 is a side view similar to FIG. 7 with the fuel tank filled with fuel to a level to close the float valve.
Figure 10:
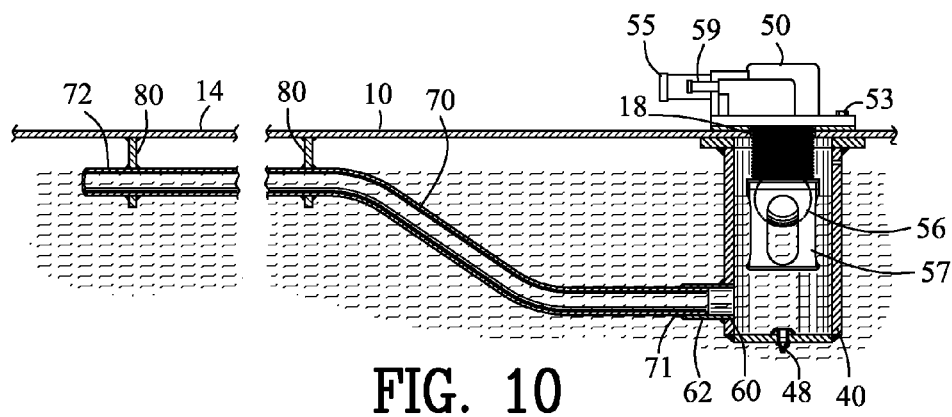
FIG. 10 is an enlarged view of FIG. 9.

FIGS. 9 and 10 are side views similar to FIG. 7 with the fuel tank filled with fuel to a level to close the float valve 50. When the level of the fuel reaches a level in the fuel tank 10 to enter the distal end 72 of the vent pipe 70, the fuel floods into the internal volume 45 of the canister 40 to raise the ball valve 56 within the cage 57 to close the float valve 50. Similarly, when the level of the fuel reaches a level in the fuel tank 10 to enter the distal end 72A of the vent pipe 70A, the fuel floods into the internal volume of the canister 40A to close the float valve 50A. The closing of the float valves 50 and 50A creates a backpressure thereby terminating the flow of fuel entering into the fuel tank 10 as should be well known to those skilled in the art. When the fuel tank 10 is completely filled with fuel, the relief vent orifice 49 communicating with the minor channel 58 functions as pressure relief vent for the fuel tank 10.

Referring back to FIGS. 1-2, the hanger 80 locates the distal end 72 of the vent pipe 70 in proximity to forward corner of the fuel tank 10. The hanger 80A locates the distal end 72A of the vent pipe 70A in proximity to aft opposite corner of the fuel tank 10.

In this example, the hanger 80 locates the distal end 72 of the vent pipe 70 in proximity to the corner or intersection of the tank bow wall 12 and the tank port side wall 15. The hanger 80A locates the distal end 72A of the vent pipe 70A in proximity to the corner or intersection of the tank stern wall 13 and the tank starboard side wall 16.

In the alternative, the hanger 80 may locate the distal end 72 of the vent pipe 70 in proximity to the corner or intersection of the tank bow wall 12 and the tank starboard side wall 16. The hanger 80A locates the distal end 72A of the vent pipe 70A in proximity to the corner or intersection of the tank stern wall 13 and the tank port side wall 15.

The American Boat and Yacht Council (ABYC) standard H-24 Gasoline Fuel Systems set forth the tilt testing for ullage or air space requirements for marine vessels under 26 feet and for marine vessels 26 feet and over. The following TABLE 1 sets forth the pitch and roll requirements of the ABYC standard H-24.

| Vessel Length | Stern Up | Bow Up | Starboard Roll | Port Roll |
|---|---|---|---|---|
| Less than 26 feet | 17° | 17° | 7° | 7° |
| 26 feet & Over | 7° | 7° | 4° | 4° |

These tip and tilt standards can result in fuel capacity losses up to or possibly exceeding 30% for some vessels. These extreme capacity losses are especially true if the vent fittings are located near the center of the fuel tank.

The present invention solves the problem of the accommodating with the access requirement to the float valve 50 required by the U.S. Coast Guard regulations in 33 CFR 183.554 while simultaneously accommodating for the pitch and roll requirements of fuel tank vent as prescribed by ABYC standard H-24.

FIGS. 11-14 shows the marine vessel 20 of FIG. 1 exemplifying the pitch and roll requirements prescribed by ABYC standard H-24 for a marine vessel 20 under 26 feet in length. The position of the fuel within the fuel tank relative to the positions of the distal ends 72 and 72A of the vent pipes 70 and 70A demonstrate the effectiveness of the present invention.

FIG. 11 is a side view of the marine vessel of FIG. 1 with the stern pitched upward seventeen (17°) degrees. In this orientation, the vent pipe 70A is disposed above the fuel level to properly vent the fuel tank 10.

FIG. 12 is a side view of the marine vessel of FIG. 1 with the bow pitched upward seventeen (17°) degrees. In this orientation, the vent pipe 70 is disposed above the fuel level to properly vent the fuel tank 10.

FIG. 13 is a front view of the marine vessel of FIG. 1 with the hull rolled seven (7°) degrees to starboard. In this orientation, the vent pipe 70 is disposed above the fuel level to properly vent the fuel tank 10.

FIG. 14 is a front view of the marine vessel of FIG. 1 with the hull rolled seven (7°) degrees to port. In this orientation, the vent pipe 70A is disposed above the fuel level to properly vent the fuel tank 10.

In addition to the pitch and roll requirements set forth in the above TABLE 1, the ABYC standard H-24 also requires simultaneous pitch and roll orientations. For example, the ABYC standard H-24 requires venting with bow or stern up seventeen degrees (17°) simultaneously with starboard or port roll of seven degrees (7°). Although not illustrated herein, the present invention satisfies the simultaneous pitch and roll orientations set forth in ABYC standard H-24.

Referring back to FIGS. 1-3, the major vent output pipe 55 of the float valves 50 and 50A are connected to an external vapor containment system 90. The external vapor containment system 90 may be a passive purge system 92 as shown in FIGS. 1 and 2 or a sealed system (not shown). The use of passive purge systems or sealed systems should be well known to those skilled in the art.

Although the present invention has been shown constructed of a metallic material such as aluminum, it should be understood that the present invention is equally applicable for use with other types of metallic material such as stainless steel as well as non-metallic material such as various types of polymeric materials.

The present invention enables the canister 40 to be located in a first preferred location for servicing of the float valve 50 while simultaneously locating the distal end 72 of the vent pipe 70 in a second preferred location for enabling venting upon the simultaneous pitch and roll of the fuel tank 10.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An improved vent for a fuel tank having a tank top wall defining an access aperture, comprising:
a canister having a bottom wall and a side wall extending from said bottom wall to define an internal volume having an open top;
a mounting for securing said canister to an interior surface of said tank top wall with said open top of said a canister adjacent to the access aperture defined in the tank top wall;
a float valve located within said canister for sealing said open top of said canister;
a major vent output pipe interconnecting said internal volume of said canister external to the fuel tank;
a vent aperture defined in said canister providing a fluid path below said float valve;
a vent pipe extending between a proximal end and a distal end;
said proximal end of said vent pipe connected to said vent aperture defined in said canister; and
a hanger securing said distal end of said vent pipe proximate to said interior surface of said tank top wall for venting the fuel tank during fuel entering the fuel tank and for enabling fuel entering said distal end of said vent pipe to close said float valve to limit the amount of fuel entering into the fuel tank.

2. An improved vent for a fuel tank as set forth in claim 1, wherein said canister is located in a first preferred location for servicing of said float valve and said distal end of said vent pipe is located in a second preferred location for enabling venting upon the tilting of the fuel tank.

3. An improved vent for a fuel tank as set forth in claim 1, including a one-way valve located in said bottom wall of said canister for draining fuel from said canister into the fuel tank.

4. An improved vent for a fuel tank as set forth in claim 1, wherein said canister is connected to a major vent output pipe extending external to the fuel tank.

5. An improved vent for a fuel tank as set forth in claim 1, including a second vent pipe extending between a proximal end and a distal end with said proximal end of said second vent pipe in fluid communication with said canister below said float valve; and
a second hanger securing said distal end of said second vent pipe proximate to said interior surface of said tank top wall remote from said distal end of said first vent pipe for venting the fuel tank during fuel entering the fuel tank and for enabling fuel entering said distal end of said second vent pipe to close said float valve to limit the amount of fuel entering into the fuel tank.

6. An improved vent for a fuel tank having a tank top wall defining an access aperture, comprising:
a canister having a bottom wall and a side wall extending from said bottom wall to define an open top;
said side wall being secured to an interior surface of said tank top wall adjacent to the access aperture defined in the tank top wall;
a float valve having a closure flange removably secured to an exterior surface of said tank top wall for sealing said open top of said canister with said float valve located within said canister;
a vent aperture defined in said canister below said float valve;
a vent pipe extending between a proximal end and a distal end;
said proximal end of said vent pipe connected to said vent aperture defined in said canister; and
a hanger securing said distal end of said vent pipe proximate to said interior surface of said tank top wall for venting the fuel tank during fuel entering the fuel tank and for enabling fuel entering said distal end of said vent pipe to close said float valve to limit the amount of fuel entering into the fuel tank.

7. An improved vent for a fuel tank as set forth in claim 6, wherein said canister is located in a first preferred location for servicing of said float valve and said distal end of said vent pipe is located at a second preferred location for enabling venting upon the tilting of the fuel tank.

8. An improved vent for a fuel tank as set forth in claim 6, wherein said float valve is removably secured to an exterior surface of said tank top wall for inspection and servicing of said float valve.

9. An improved vent for a fuel tank as set forth in claim 6, including a one-way valve located in said bottom wall of said canister for draining fuel from said canister into the fuel tank.

10. An improved vent for a fuel tank as set forth in claim 6, including a major vent output pipe extending external the fuel tank from said float valve for connection to an external vapor containment system.

11. An improved vent for a fuel tank as set forth in claim 6, including a major vent output pipe extending external the fuel tank from said float valve for venting the fuel tank for connection to a passive purge system or a sealed system.

12. An improved vent for a fuel tank having a tank top wall defining an access aperture, comprising:
   a canister having a bottom wall and a side wall extending from said bottom wall to define an internal volume having an open top;
   a mounting for securing said canister to an interior surface of said tank top wall with said open top of said a canister adjacent to the access aperture defined in the tank top wall;
   a float valve located within said canister for sealing said open top of said canister;
   a first vent pipe extending between a proximal end and a distal end;
   a second vent pipe extending between a proximal end and a distal end;
   said proximal end of said first and second vent pipes in fluid communication with said canister below said float valve; and
   a first and a second hanger securing said distal end of said first and second vent pipes proximate to said interior surface of said tank top wall and a remote locations relative to one another for venting the fuel tank during fuel entering the fuel tank and for enabling fuel entering said distal end of said second vent pipe to close said float valve to limit the amount of fuel entering into the fuel tank.

13. An improved vent for a fuel tank having a tank top wall defining an access aperture, comprising:
   a canister having a bottom wall and a side wall extending from said bottom wall to define an internal volume having an open top;
   a mounting for securing said canister to an interior surface of said tank top wall with said open top of said a canister adjacent to the access aperture defined in the tank top wall;
   a float valve removably secured to an exterior surface of said tank top wall for inspection and servicing of said float valve;
   a major vent output pipe interconnecting said internal volume of said canister external to the fuel tank;
   a vent pipe extending between a proximal end and a distal end;
   said proximal end of said vent pipe being in fluid communication with said canister below said float valve; and
   a hanger securing said distal end of said vent pipe proximate to said interior surface of said tank top wall for venting the fuel tank during fuel entering the fuel tank and for enabling fuel entering said distal end of said vent pipe to close said float valve to limit the amount of fuel entering into the fuel tank.

* * * * *